US009324151B2

(12) United States Patent
Snavely et al.

(10) Patent No.: US 9,324,151 B2
(45) Date of Patent: Apr. 26, 2016

(54) SYSTEM AND METHODS FOR WORLD-SCALE CAMERA POSE ESTIMATION

(71) Applicant: Cornell University, Ithaca, NY (US)

(72) Inventors: Noah Snavely, Menlo Park, CA (US); Daniel Huttenlocher, Trumansburg, NY (US); Yungpeng Li, Zurich (CH)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/361,547

(22) PCT Filed: Dec. 8, 2012

(86) PCT No.: PCT/US2012/068648
§ 371 (c)(1),
(2) Date: May 29, 2014

(87) PCT Pub. No.: WO2013/086475
PCT Pub. Date: Jun. 13, 2013

(65) Prior Publication Data
US 2014/0314322 A1  Oct. 23, 2014

Related U.S. Application Data

(60) Provisional application No. 61/568,183, filed on Dec. 8, 2011.

(51) Int. Cl.
*G06T 7/00* (2006.01)
*G06F 17/30* (2006.01)
*G06K 9/00* (2006.01)

(52) U.S. Cl.
CPC ........ *G06T 7/0044* (2013.01); *G06F 17/30247* (2013.01); *G06K 9/00664* (2013.01); *G06T 7/0046* (2013.01); *G06T 2200/04* (2013.01); *G06T 2207/30244* (2013.01)

(58) Field of Classification Search
None
See application file for complete search history.

(56) References Cited

U.S. PATENT DOCUMENTS

| 8,803,912 | B1* | 8/2014 | Fouts | 345/629 |
| 2003/0044048 | A1 | 3/2003 | Zhang et al. | |
| 2005/0190972 | A1 | 9/2005 | Thomas et al. | |
| 2006/0256200 | A1 | 11/2006 | Matei et al. | |
| 2007/0031064 | A1 | 2/2007 | Zhao et al. | |
| 2011/0064312 | A1 | 3/2011 | Janky et al. | |
| 2011/0187716 | A1 | 8/2011 | Chen et al. | |
| 2012/0069019 | A1* | 3/2012 | Richards | 345/421 |
| 2012/0105473 | A1* | 5/2012 | Bar-Zeev et al. | 345/633 |
| 2014/0293016 | A1* | 10/2014 | Benhimane et al. | 348/50 |

OTHER PUBLICATIONS

Lowe, Distinctive Image Features from Scale-Invariant Keypoints, 2004, International Journal of Computer Vision 60(2), pp. 91-110.*

* cited by examiner

*Primary Examiner* — David F Dunphy
(74) *Attorney, Agent, or Firm* — Valauskas Corder LLC (57) ABSTRACT

System and methods for determining where a digital photograph was taken by estimating the camera pose with respect to a global scale three-dimensional database. Accurate location and orientation of the digital photograph is established through feature correspondence and geometry estimated from photograph collections.

18 Claims, 4 Drawing Sheets

SYSTEM AND METHODS FOR WORLD-SCALE CAMERA POSE ESTIMATION

PRIORITY CLAIM

This application claims the benefit of U.S. Provisional Application No. 61/568,183 filed Dec. 8, 2011.

STATEMENT CONCERNING U.S. GOVERNMENT SPONSORED RESEARCH

This invention was made with U.S. government support under grants IIS-0964027 and IIS-0713185 awarded by the National Science Foundation (NSF). The U.S. government has certain rights in the invention.

FIELD OF THE INVENTION

The present invention relates generally to computer vision systems. More specifically, the present invention relates to estimating the location or the orientation of a digital photograph in order to know exactly where on the Earth's surface a particular photograph was taken, which direction the photo is oriented, as well as other parameters, such as the zoom level of the photo.

Knowing exactly where a photograph was taken and how it was oriented may be useful in a variety of applications, including, for example, photo browsing and organization, augmented reality and navigation, as well as intelligence and forensic applications.

BACKGROUND OF THE INVENTION

Localizing where a photo or video was taken is a key problem in computer vision, with a broad range of applications in consumer photography, augmented reality, photo editing, autonomous and human navigation, and forensics. Information about camera location can also aid in other vision tasks, such as estimating the illumination of a photograph and scene understanding. With the rapid growth of online photo sharing sites as well as the creation of more structured image collections such as Google's Street View, increasingly any new photo can in principle be localized with respect to this growing set of existing imagery.

There are several problem areas of recent interest in computer vision including landmark recognition and localization as well as localization from point clouds. With respect to landmark recognition and localization, the problem of "where was this photo taken?" can be answered in several ways. Some techniques approach the problem as that of classification into one of a predefined set of place names—e.g., "Eiffel Tower" or "Empire State Building". Another is to create a database of localized imagery, then formulate the problem as that of image retrieval, after which the query image can be associated with the location of the retrieved images. The interpretation of the results of such methods varies from technique to technique. In what is known as im2gps, the location of arbitrary images such as "forests" and "deserts" have been characterized with a rough probability distribution over the surface of the Earth with confidences on the order of hundreds of kilometers. In other related work, human travel priors are used to improve performance for sequences of images, but the resulting locations remain fairly coarse. Other work seeks to localize urban images more precisely, often by matching to databases of street-side imagery using Bag-of-Words (BoW) retrieval techniques.

With respect to localization from point clouds, results of structure from motion (SfM) techniques are leveraged, for example, certain work uses SfM reconstructions to generate a set of "virtual" images that cover a scene, then index these as documents using BoW methods. Direct 2D-to-3D approaches have recently been used to establish correspondence between the reconstructed 3D model and the query image without going through an intermediate image retrieval step. While inverse matching from 3D points to image features can sometimes find correct matches very quickly though search prioritization, its success is dependent on being able to find them early on in the search process. Thus, it become less effective when as the size of the model grows. Certain other work follows the more conventional forward matching from image features to 3D points, but uses search prioritization to avoid considering every image feature and hence improving matching speed. However, the accuracy of camera pose estimation may decrease since it results in a smaller set of matches. Moreover, the set of matches obtained in this way is often noisy enough such that RANdom SAmple Consensus (RANSAC) needs to be run for up to one minute.

In many applications of digital photos, one wants to know exactly where on the Earth's surface a given photograph was taken, and which direction it was looking. At times one has Global Positioning Systems (GPS) associate with the photo, which gives approximate camera location, but at times one wants much more accurate information than what GPS provides. In other situations, GPS information is unavailable for a photo.

Clearly, there is a demand for a system and methods for determining where a photograph was taken by estimating camera pose using a world-wide point cloud database to which the photograph is matched. The present invention satisfies this demand.

SUMMARY OF THE INVENTION

The present invention relates to a system and methods that compute a "pixel-accurate" camera pose. For purposes of this application, the term "pose" pertains to the location, orientation, and intrinsics. The terms "location" and "position" are used interchangeably herein and refer to the spot where the photograph was taken in terms of longitude, latitude, and altitude of the camera. The term "orientation" refers to the direction in which the camera was facing when the photograph was taken in terms of points on a compass, the "tilt" of the camera (its elevation angle with respect to the horizon), and the camera roll (whether the camera was rotated about its own principal axis). The term "intrinsics" refers to any parameter associated with the camera such as focal length (or zoom level) and radial lens distortion.

Specifically, the present invention determines where a digital photograph was taken by estimating the camera pose with respect to a global-scale three-dimensional database. According to the invention, accurate location or orientation for a digital photograph is estimated by matching the photograph to a database created from photos all around the world. For purposes of this application, the terms "photograph", "photo", and "image" are used interchangeably herein.

The present invention estimates accurate location or orientation of a photo at the scale of the world, i.e., with no known GPS. It is fast in that it operates in seconds, robust in that it gets a high recall if the database has images related to the input image, and accurate in that it locates cameras to within meters. This is made possible through methods for matching features in an image to a large database of 3D points covering the world, and for estimating world-scale pose given these matches.

More specifically, where a photo was taken is determined by estimating the camera pose with respect to a database such as a global scale 3D point cloud, bringing together research on image localization, landmark recognition and 3D pose estimation. The present invention scales to very large datasets (for instance, with hundreds of thousands of images and tens of millions of 3D points) through the use of two techniques: a co-occurrence prior for RANdom SAmple Consensus (RANSAC) and bidirectional matching of image features with 3D points or features belonging to 3D points.

The present invention automatically determines a given image's camera pose in a geo-centered coordinate system. The present invention directly establishes correspondence between 2D features in an image and 3D points in a database covering places around the world, yielding a camera pose consistent with these feature matches. In one embodiment, the database is a 3D point cloud created by running structure from motion (SfM) on over 2 million images, resulting in over 800K images and more than 70 million 3D points, covering hundreds of distinct places around the globe. Although the present invention is discussed with respect to a 3D point cloud, any database is contemplated such as a database created from running structure from motion on any image collection.

The database can be drawn from any number of datasets. In one embodiment, the database is drawn from three individual datasets: a "landmarks" dataset created from over 200,000 geotagged high-resolution Flickr photos of world's top 1,000 landmarks, the recently released "San Francisco" dataset with over a million low-resolution images planar-reprojected and cropped from panoramas, and a smaller dataset from a college campus with accurate ground truth of input query image locations.

The present invention provides a scalable method for accurately recovering 3D camera pose from a single photograph taken at an unknown location, thereby going well beyond the rough identification of position achieved by today's large-scale image localization methods. The 2D-to-3D matching approach to image localization is advantageous compared to image retrieval approaches because the pose estimate provides a powerful geometric constraint for validating a hypothesized location of an image, thereby improving recall and precision. Moreover, prior information on 3D points can be exploited, such as the stability of image features corresponding to a given point, as well as co-occurrence statistics of sets of 3D points or features, in order to address both scalability and accuracy.

To find good correspondences to image features in a massive database of 3D points, the common approach of using approximate nearest neighbors is taken to match features between an image and a set of database features, then a hypothesize-and-test framework is used to find a camera pose and a set of inlier correspondences consistent with that pose. In one embodiment, Scale-Invariant Feature Transform (SIFT) features are matched between an image and a set of database features. However, with such large 3D models the retrieved correspondences often contain so many incorrect matches that standard matching and RANSAC techniques have difficulty finding the correct pose. Thus, the present invention uses prior information about the co-occurrence of 3D model points in images to speed up RANSAC, and a bi-directional matching scheme between model points and image features.

Model points that co-occur frequently in images are much more likely to belong to a consistent match set than those that rarely or never co-occur. Co-occurrence statistics of points in database images are used as a prior to guide the sampling in RANSAC so as to efficiently identify sets of correspondences that are likely to be geometrically consistent. This non-uniform sampling technique can often succeed within a small number of RANSAC rounds (e.g., 1,000) even with inlier rates of less than 1%, which is critical to fast and accurate matching to a large set of 3D points. While robust, the RANSAC algorithm still needs sufficient inlier matches to begin with; with tens of millions of 3D points, fast and accurate retrieval of potential matching model points based on high-dimensional feature descriptors (e.g., SIFT) is a central challenge. Therefore, a bidirectional matching scheme aimed at boosting the recovery of true correspondences between model points and image features is employed. This scheme combines traditional "forward matching" from features in the image to points in the database, with the recently proposed "inverse matching" from points to image features, which performs better than either the forward or inverse matching technique alone.

One advantage of the present invention includes photo browsing and organization. It is contemplated that the present invention can automatically geographically tag photos in various photo collections, as well as automatically tag photos with the objects in the field of view—e.g., "Statute of Liberty" or "Times Square"—based on the accurate location or orientation computed for the photo. Advantageously, this works even if the photo does not have GPS, or if the GPS is inaccurate.

Another advantage of the present invention includes augmented reality and navigation. Applications that require augmenting photos with annotations or other information or for providing navigational instructions often require very accurate ("pixel accurate") geo-registration. GPS is often too coarse an estimate of location for this kind of task.

Another advantage of the present invention includes intelligence and forensics. Military and law enforcement agencies often deal with photos from uncooperative sources, for example, from hard drives or cameras captured in the field. Extracting intelligence or other information from these images is often of critical importance. The present invention accommodates such uncontrolled imagery.

The present invention and its attributes and advantages may be further understood and appreciated with reference to the detailed description below of one contemplated embodiment, taken in conjunction with the accompanying drawings.

DESCRIPTION OF THE DRAWINGS

The preferred embodiments of the invention will be described in conjunction with the figures provided herein to illustrate and not to the limit the invention.

DETAILED DESCRIPTION OF THE INVENTION

The present invention occurs in two stages: (1) a database construction stage, performed offline, and (2) an image-to-database matching and camera-pose-estimation stage, performed at runtime. The database construction stage results in a database of 3D features and associated feature descriptors.

Specifically, the database construction stage takes as input a large set of images with "geotags". "Geotags" are annotations of latitude and longitude. The images are grouped into subsets corresponding to different landmarks, and a database comprised of one or more points (referred to as points in the database or database points)—such as 3D points—is constructed along with one or more associated feature descriptors for each point in the database.

The database is used in the image-to-database matching and camera-pose-estimation stage to provide the location or orientation in the world for an input image. Specifically, a query image is matched to the database and the camera pose is estimated. Camera pose describes information about where in the world the photograph was taken, and is comprised of the camera's latitude, longitude, altitude, orientation, focal length, and radial lens distortion parameters.

Figure 1:
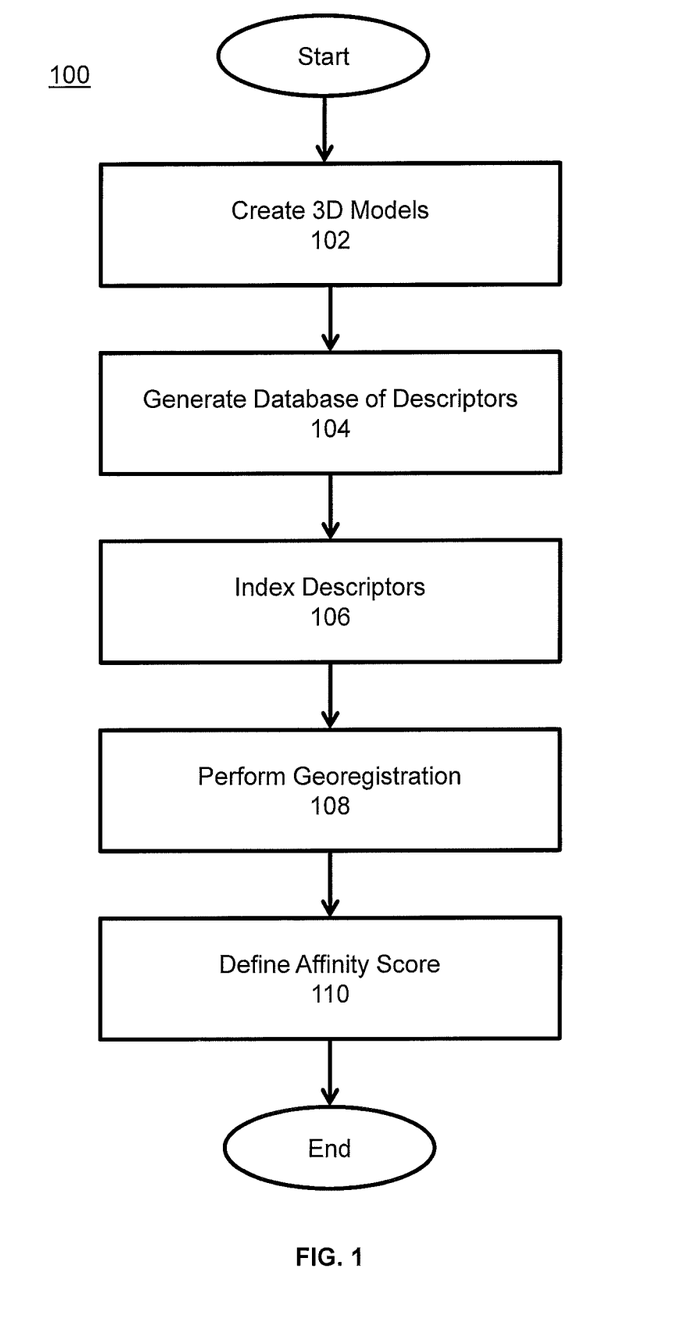
FIG. 1 is a flow chart illustrating construction of a database.

A database of database images, points—such as 3D points—, and associated feature descriptors is constructed 100 as shown by the flowchart in FIG. 1. At step 102, a model of one or more scenes is created. In one embodiment, the model is a 3D model.

Each scene of the model includes one or more database images and one or more points. For each database image, feature extraction—e.g., using SIFT—is performed to extract features from each database image. Features on pairs of database images are matched and information for each scene is derived. Information for each scene includes one or more camera poses, one or more points, a visibility relation describing which points in the database are visible in which images, and, for each point in the database, a set of feature descriptors.

For each point, a database of one or more feature descriptors is generated at step 104. A feature descriptor is a high-dimensional point describing the appearance of that point in the database images. For each scene, and for each point, the system creates one or more feature descriptors, for instance, by taking the average of all of descriptors associated with that point in the database, by clustering the descriptors into a smaller set, or by using all of the descriptors unchanged.

The one or more feature descriptors is then indexed using a data structure as shown by step 106. The descriptors are indexed to a data structure that allows for efficient approximate nearest neighbor computation. For example, the data structure may be a k-dimensional tree (kd-tree).

Geo-registration may be performed as shown by step 108. Each scene is geo-registered. Specifically, each scene is aligned to a surface of the Earth using the geotags included with the input photographs. In particular, for each scene, a gravity vector is estimated by analyzing the orientations of the cameras in scene. Once the gravity vector is estimated, a robust alignment process is used to compute a similarity transformation between the camera locations and the geotags. Estimating the gravity vector may also include assessing vanishing points detected in each database image and/or analyzing the orientations of one or more cameras in each scene.

Finally, an affinity score may be defined for each pair of points in the database as shown by step 110. This affinity may be, for example, defined as the number of database images in which a pair of points appear.

Figure 2:
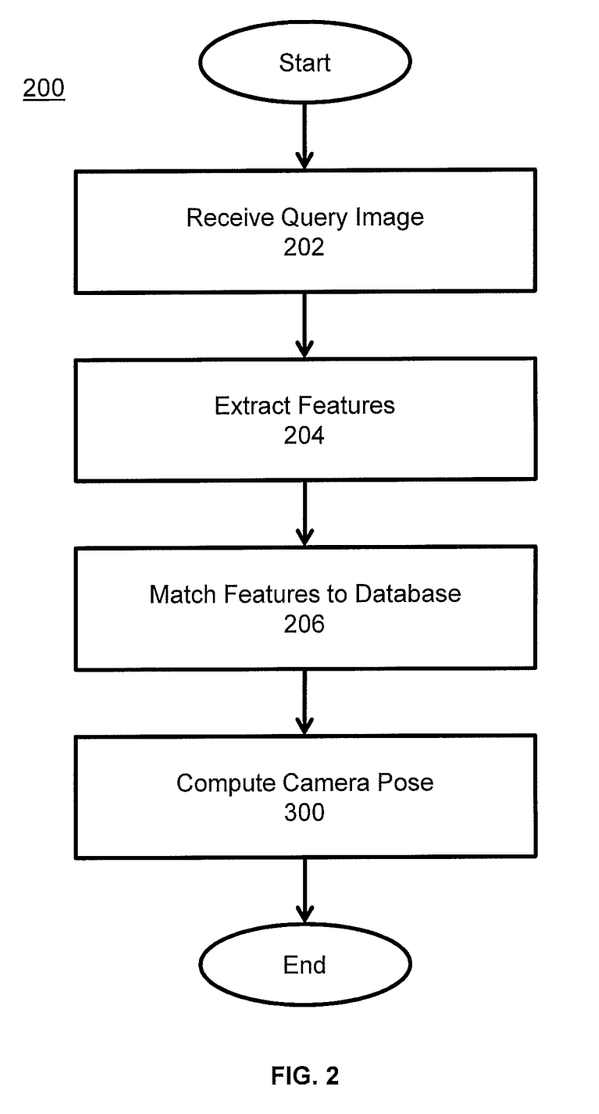
FIG. 2 is a flow chart illustrating an image-to-database matching and a camera-pose-estimation.

Matching an image to the database and estimating its pose 200 is shown by the flowchart in FIG. 2. A query image or input query image is received at step 202. Features are extracted at step 204 from the query image, for example, using SIFT.

As shown by step 206, query image features are matched to the database. A match is a point in the input query image and a point in the database. More specifically, each match is comprised of a point in the query image and a point in the database. Each match may further include a match distance. For each feature in the query image, one or more nearest neighbor features in the database are computed using the data structure created from indexing descriptors in step 108 of FIG. 1. A match between a query feature and a database feature is kept based on a computed distance, for instance if the ratio of distances to the top two nearest neighbors is smaller than a certain threshold. A match distance may be the ratio of distances to the top two nearest neighbors. If the number of matches kept in step 206 is smaller than a threshold, the matches may be expanded to include more of the top matches as ranked by their distances.

The camera pose is computed in step 300 from the matches found in step 206. Since matches found according to step 206 are noisy, and many of them are incorrect, it is difficult to compute a camera pose from the full set of matches directly. Therefore, the present invention computes the camera pose using what is referred to as "Guided RANSAC".

Figure 3:
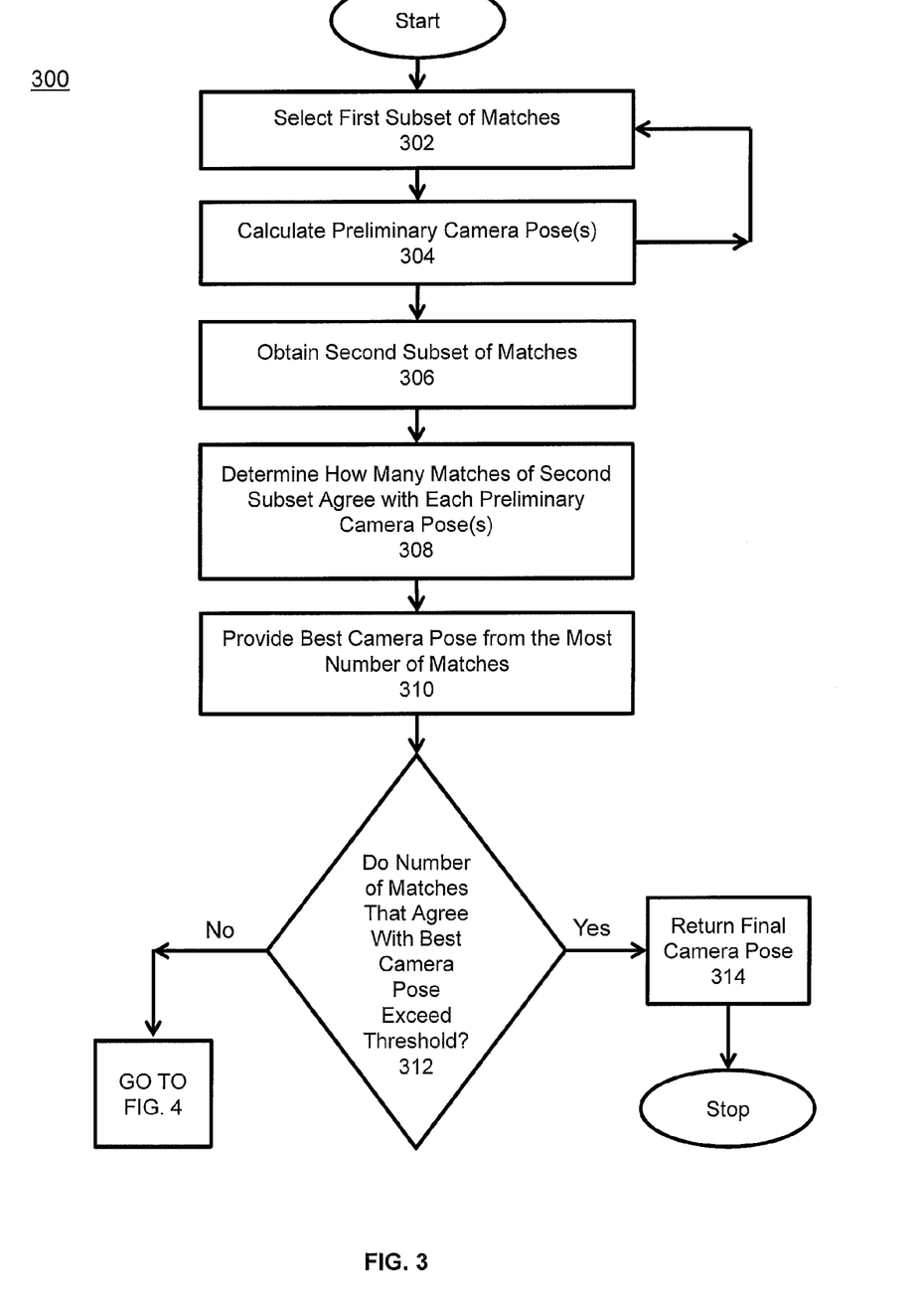
FIG. 3 is a flow chart illustrating computation of a camera pose.

FIG. 3 is a flow chart illustrating computation of a camera pose 300 using Guided RANSAC. At step 302, a small subset of matches is selected according to a randomized selection process. As an example, a subset of 3 or 4 matches may be selected depending on whether the focal length of the image is known or unknown, respectively. This selection process is more likely to select subsets of matches that co-occur more frequently in the database images—hence "guided"—, over subsets of matches that co-occur less frequently. For instance, the selection process might select a subset of matches with probability proportional to how often the database points corresponding to those matches appear all at once in the same database image. In addition, the subset of matches may be limited to a comprise matches to 3D points within certain radial distance (such as 5 miles) measured from an estimate of the camera's position. In addition or furthermore, the subset of matches may be limited to comprise matches to 3D points within a certain distance of each other.

From the subset of matches selected, a preliminary camera pose is computed at step 304 using the 3D positions of matched points in the database and the 2D positions of the corresponding query image features using an estimation algorithm. Step 302 and step 304 may be performed once or repeated a specified number of times, each randomized so that a different subset of matches may be chosen on each round in order to calculate a number of individual preliminary camera poses at step 304. Based on this preliminary computed pose (s), the remaining matches or second subset of matches are obtained at step 306. At step 308, the matches of the second subset of matches are compared to each individual preliminary camera pose to determine the number of matches that agree with each individual preliminary camera pose. After generating a number of camera poses in this manner, the preliminary camera pose with the highest number of agreeing matches is provided at step 310 as the best camera pose. The best camera pose may also be optionally refined using all of the agreeing matches. If the number of agreeing matches of this best camera pose is greater than a threshold at step 312, this camera pose is returned at step 314. If the number of agreeing matches of the best camera pose does not exceed the threshold at step 312, then an alternate computation of the camera pose 400 may be used to expand the set of matches as discussed in FIG. 4. This alternate computation is also referred to as "bidirectional matching".

As shown by step 206, query image features are matched to the database. If the number of matches kept in step 206 is smaller than a threshold, the matches may be expanded to include more of the top matches as ranked by their distances.

Figure 4:
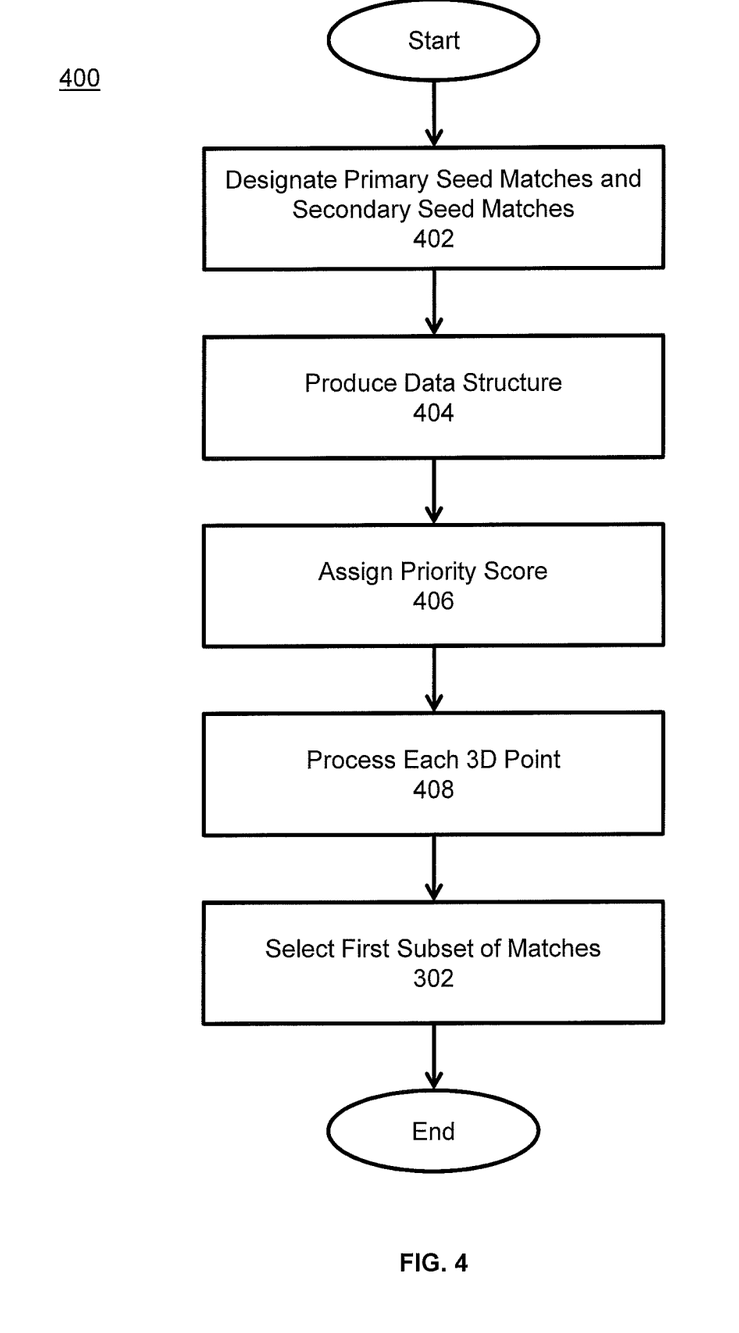
FIG. 4 is a flow chart illustrating an alternate computation of the camera pose.

According to step 402, matches produced by matching query image features to the database according to step 206 (FIG. 2) with a match distance less than a threshold, as well as the matches agreeing with the best camera pose in in step 310 (FIG. 3), are designated as primary seed matches and the remaining matches produced in step 206 (FIG. 2) are designated as secondary seed matches.

At step 404, a nearest neighbors data structure, such as a kd-tree, is created from the set of feature descriptors in the input query image and a priority score is assigned at step 406. The priority score at step 406 is associated with every point in the database. This priority score, for instance, may be defined as the sum, over each primary seed match, of the number of images that see both the primary seed match and the point in the database in question. The points in the database corresponding to zero or more primary seed matches are given a large priority score, and the points in the database corresponding to zero or more secondary seed matches are given a smaller, but high priority.

At step 408, each point in the database, processed in decreasing order of priority, is matched to the query image features using the data structure produced in step 404, and one or more nearest neighbors, specifically, the one or more nearest neighboring feature descriptors in the query image found using the data structure built from the query image descriptors are retained. If a computed distance, such as the ratio of the distances from the database point's descriptor to the top two nearest neighbors in the query image, is smaller than a threshold, then a match comprised of the point in the database and the nearest neighbor query image feature is kept. The priority of each point may then be updated. In this event, points in the database with a non-zero affinity with the point in the database being processed have their priority increased, either at the time of processing or at some later stage in the algorithm.

After a number of points in the database are processed in this manner, then the camera pose is re-estimated with the augmented set of feature matches identified in step 408. The camera pose is computed according to FIG. 3, but now using the augmented set of matches.

To provide a quantitative evaluation of the effectiveness of the present invention, three datasets were tested, separately and combined. Following is a discussion of the evaluation using the three datasets.

The first dataset of "landmarks" consists of a large set of photos of famous places downloaded from Flickr. A list of geotagged Flickr photos from the world's top 1,000 landmarks was obtained. A set of point cloud models was created by running SfM on each of the 1,000 individual collections. The upright orientation of each model was estimated and the 3D model was geo-registered using the image geotags, so that its coordinates can be mapped to actual locations on the globe. SfM yields a set of 3D points, a subset of the images registered with respect to the 3D points, a camera location for each registered image, and for each 3D point the image features that were matched to it. The image features that were matched to each 3D point allows for the computation of point co-occurrence statistics. For evaluation, a set of test images were created by removing a random subset of 10,000 images from the scene. Specifically, the test images and their contribution to the SIFT descriptors of points were removed from the image database, and any 3D points that are no longer visible in at least two images are deleted.

Each test image has a known landmark ID, which can be compared with the ID inferred from an estimated camera pose for evaluation. Though this ID information is somewhat noisy due to overlapping landmarks, it can provide an upper bound on the false registration rate for the dataset. Since the test images come from the original reconstructions, it should be possible to achieve a 100% recall rate.

The second dataset consists of a recently published San Francisco data set, which contains 640×480 resolution perspective images cropped from omnidirectional panoramas. Two types of images are created: perspective central images (PCI) and perspective frontal images (PFI). Each of these images, and each of the 803 separate 640×480 test images taken by camera phones (not used in reconstruction), is furnished with a building ID, which can be used to evaluate the performance of image retrieval or pose estimation. The 3D model was reconstructed using only the PCIs, and did not use of the PFIs as these images have non-standard imaging geometry. Two SfM models were reconstructed—one using the raw PCIs (to be consistent with the other datasets), and one using upright SIFT features extracted from histogram-equalized versions of the database images. The model was geo-registered using provided geotags. Images that were not reconstructed by SfM were ignored. This is an interesting benchmark, as the database images have different characteristics, such as panorama crops, compared to the test images, comprised of cell phone photos.

The first two datasets only provide coarse ground truth for locations, in the form of landmark and building identifiers. Although geotags exist for the test images, they typically have errors in the tens (or hundreds) of meters, and are thus too imprecise for finer evaluation for positional accuracy. Therefore, the third dataset used comes with a large database of images of a campus quad as well as a separate set of test images with accurate, sub-meter error geotags. This data set is referred to herein as "Quad". SfM was run on the database images, and the accurately geotagged photos were used to test localization error.

The effectiveness is evaluated of exploiting point co-occurrence statistics for RANSAC using the registration rate, i.e., the percentage of query images registered to the model. For RANSAC with co-occurrence prior, 0.9 is used as the ratio test threshold. For regular RANSAC without co-occurrence, three different thresholds were experimented (r=0.7, 0.8, and 0.9), the best of which at 10,000 RANSAC rounds (r=0.8) has performance roughly equal to running just 10 rounds with co-occurrence. These results demonstrate the advantage of using co-occurrence information to guide sampling, especially when the number of rounds is small.

The performance gain from bidirectional matching is also evaluated. Experiments were performed with average descriptors as well as with all feature descriptors for the points. The results show that bidirectional matching significantly boosts the registration rate, whether or not co-occurrence based RANSAC is used. Similarly, the use of co-occurrence is also always beneficial, with or without bidirectional matching, and the advantage is more pronounced when all feature descriptors are used, rather than average descriptors for each database point, as this produces more matches, but also more outliers. Since co-occurrence together with bidirectional matching produced the highest performance, this combination was used for the remaining experiments.

To estimate the precision of registration, namely the fraction of query images correctly registered, and equivalently the false registration rate or likelihood of false registrations, the 1000-way landmark classification problem is considered. The inferred landmark ID is simply taken to be the one with the most points registered with the image. The classification rate among the registered images is 98.1% when using average point descriptors and 97.9% when using all descriptors. However, the remaining 2% of images may not all be false registrations, since some of the landmarks visually overlap and thus the classification objective is not always unambiguous.

To better estimate the false registration rate, the present invention was tested with a set of 1468 "negative images" that are photos of other landmarks far away from the top 1000 in the data set. Among these, 10 were registered (both for average/all descriptors), which corresponds to a false registration rate of 0.68%. Indeed, the false registrations are almost always due to identical-looking signs and logos.

The present invention was also tested on the San Francisco data set. The present invention is evaluated using the recall rate, which corresponds to the percentage of correctly registered query images. A registration is considered correct if the query image is registered to points of the correct building ID according to the ground truth annotation. The present invention outperforms previous methods even when the latter uses the extra GPS information. Although a maximum recall rate of 65% was reported by previous methods, achieving this requires the additional use of the PFIs (on top of GPS) specific to this data set. The present invention produces not just a nearby landmark or building ID, but also a definitive camera pose, including its location or orientation. This is arguably more informative than simply recognizing the landmark. All the recall rates for the present invention correspond to false registration rates between 4.1% and 5.3. As before, most false registrations are due to logos and signs, though a few are due to highly similar buildings. Sometimes correct registrations are judged as incorrect because of missing building IDs in the ground truth, which leads to an underestimate of both recall and precision.

In order to evaluate the accuracy of estimated camera positions, the present invention was tested on the Quad data set, which has accurately geotagged query images. This is a challenging data set due to the differences in season between the database images and the query images. The present invention succeeded in registering 68.4% of the query images using average descriptors and 73.0% using all descriptors. The localization error has a mean of 5.5 m and a median of 1.6 m, with about 90% for images having errors of under 10 m and 95% under 20 m. Hence despite relatively larger errors in database image geotags used to geo-register the 3D model, the present invention was able to achieve good localization accuracy comparable to that of consumer GPS.

To further study the scalability of the present invention, the reconstructed models for the three datasets are merged into a single large one by simply concatenating them together. Compared with the individual datasets, the merged set has many more things that could potentially confuse a query image. For this test the San Francisco dataset is used without histogram equalization or upright SIFT, so that all three models are reconstructed using the same type of features and hence are more potent distractors of each other. The combined model contains over 80,000 images and 70 million points. The same registration experiment is run for each of the three sets of query images on the combined model, and the results compared with those from running on the individual models. The performance gap is negligible for the Landmark dataset and small (around 2%) for the San Francisco dataset. While the gap is somewhat larger for the Quad images, this is likely due to the fact that the Quad dataset is far smaller than the other two, with only 4830 images and just over 2 million points. Hence placing it into the combined model corresponds to more than an order of magnitude increase in the amount of irrelevant information.

In this context, the decrease in registration rate for the Quad query images can be considered quite modest. Furthermore, the present invention maintains essentially the same level of localization accuracy (mean=4.9 m, median=1.9 m) when given the combined model. This shows the scalability of the present invention and its robustness to irrelevant information. The present invention takes on average a few seconds per query image of medium resolution (1-2 megapixels), excluding the time to extract the SIFT keys, when running single-threaded on an Intel Xeon 2.67 GHz CPU. While not real-time, this is quite fast considering the size of the database, and could easily be parallelized.

Most of the false registrations of the present invention involve some sort of signs or logos, which tend to be feature-rich and are identical at different places. This suggests that false registrations can be largely reduced by recognizing these types of objects, or by taking into account contextual information or missing correspondences.

It is contemplated that the present invention can compact descriptors for storing within a database to alleviate the requirement for a significant amount of memory. Otherwise, the entire database can be compressed. The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A method for determining the location or the orientation of a digital photograph, comprising the steps of:
    constructing a database of database images, points and feature descriptors;
    receiving an input query image;
    extracting features from the input query image to obtain image features;
    matching image features to the database, wherein a match is a point in the input query image and a point in the database;
    selecting one or more of a first subset of matches according to a randomized selection process, wherein each first subset of matches includes matches that co-occur more frequently in the database;
    calculating one or more preliminary camera poses;
    obtaining a second subset of matches;
    determining the number of matches of the second subset of matches that agree with each of the one or more preliminary camera poses to obtain a number of agreeing matches for each of the one or more preliminary camera poses;
    providing a best camera pose from the one or more preliminary camera poses, wherein the best camera pose is the preliminary camera pose with the largest number of agreeing matches;
    deciding if the best camera pose exceeds a threshold of the number of agreeing matches; and
    returning a final camera pose when the best camera pose exceeds the threshold of the number of agreeing matches.

2. The method for determining the location or the orientation of a digital photograph according to claim 1 wherein a match further includes a match distance that is a ratio of distances to the top two nearest neighbors of points or feature descriptors in the database, the match being kept if the match distance is smaller than a threshold.

3. The method for determining the location or the orientation of a digital photograph according to claim 1 wherein said constructing step further comprises the steps of:
creating a model of one or more scenes, wherein each scene includes one or more database images and one or more points;
generating the database of one or more feature descriptors for each point; and
indexing the one or more feature descriptors using a data structure.

4. The method for determining the location or the orientation of a digital photograph according to claim 3 wherein the model is a 3D model.

5. The method for determining the location or the orientation of a digital photograph according to claim 3 further comprising one or more of the steps of:
performing geo-registration on the model; and
defining an affinity score for each point.

6. The method for determining the location or the orientation of a digital photograph according to claim 5 wherein said performing step further comprises the steps of:
aligning each scene to a surface of Earth using geotags;
estimating a gravity vector by analyzing the orientations of one or more cameras in each scene; and
computing a similarity transformation between a location of the one or more cameras and the geotags.

7. The method for determining the location or the orientation of a digital photograph according to claim 6 wherein said estimating step further comprises one or more of the step of:
assessing vanishing points detected in each database image; and
analyzing the orientations of one or more cameras in each scene.

8. The method for determining the location or the orientation of a digital photograph according to claim 3 wherein said creating step further comprises the steps of:
extracting features from each database image;
matching features on pairs of database images; and
deriving information for each scene.

9. The method for determining the location or the orientation of a digital photograph according to claim 8 wherein the information for each scene includes one or more camera poses, one or more points, a visibility relation describing which points are visible in each database image, and one or more feature descriptors for each point.

10. The method for determining the location or the orientation of a digital photograph according to claim 3 wherein said generating step further comprises one or more selected from the steps of:
averaging all of the feature descriptors for each point;
clustering all of the feature descriptors for each point; and
using all of the feature descriptors for each point unchanged.

11. The method for determining the location or the orientation of a digital photograph according to claim 3 wherein the data structure is a k-dimensional tree.

12. The method for determining the location or the orientation of a digital photograph according to claim 1 wherein said selecting step further comprises the step of choosing three matches when a focal length of the input query image is known.

13. The method for determining the location or the orientation of a digital photograph according to claim 12 wherein said selecting step further comprises the step of choosing the subset of matches limited to a certain radial distance measured from an estimate of the camera's position.

14. The method for determining the location or the orientation of a digital photograph according to claim 1 wherein said selecting step further comprises the step of choosing four matches when a focal length of the input query image is unknown.

15. The method for determining the location or the orientation of a digital photograph according to claim 14 wherein said selecting step further comprises the step of choosing the subset of matches limited to a certain radial distance measured from an estimate of the camera's position.

16. The method for determining the location or the orientation of a digital photograph according to claim 1 wherein said deciding step further comprises the steps of:
concluding the one or more preliminary camera poses do not exceed the threshold of the number of agreeing matches;
designating zero or more primary seed matches and zero or more secondary seed matches;
producing a data structure built from the features descriptors in the input query image;
assigning a priority score to each point;
processing each point;
selecting the one or more first subset of matches to re-calculate the one or more preliminary camera poses; and
returning to said obtaining step.

17. The method for determining the location or the orientation of a digital photograph according to claim 16 wherein said assigning step further comprises the steps of:
summing, over each primary seed match, a number of database images that possess the point belonging to the primary seed match and the point in question;
allocating a large priority score when the points correspond to the zero or more primary seed matches and a small priority score when the points correspond to the zero or more secondary seed matches.

18. The method for determining the location or the orientation of a digital photograph according to claim 16 wherein said processing step further comprises the steps of:
reviewing each point in decreasing order of priority;
retaining one or more nearest neighboring feature descriptors in the input query image using the data structure built from the features descriptors in the input query image to obtain retained nearest neighboring feature descriptors;
keeping a match comprised of the point and the nearest neighbor point in the input query image when a distance computed from the feature descriptor of the point and the retained nearest neighboring feature descriptors is smaller than a certain threshold; and
updating the priority of each point based on the matches kept.

* * * * *